Dec. 7, 1926.  1,609,472
J. P. HEIL ET AL
OIL TANK CHECK VALVE
Filed Feb. 9, 1923
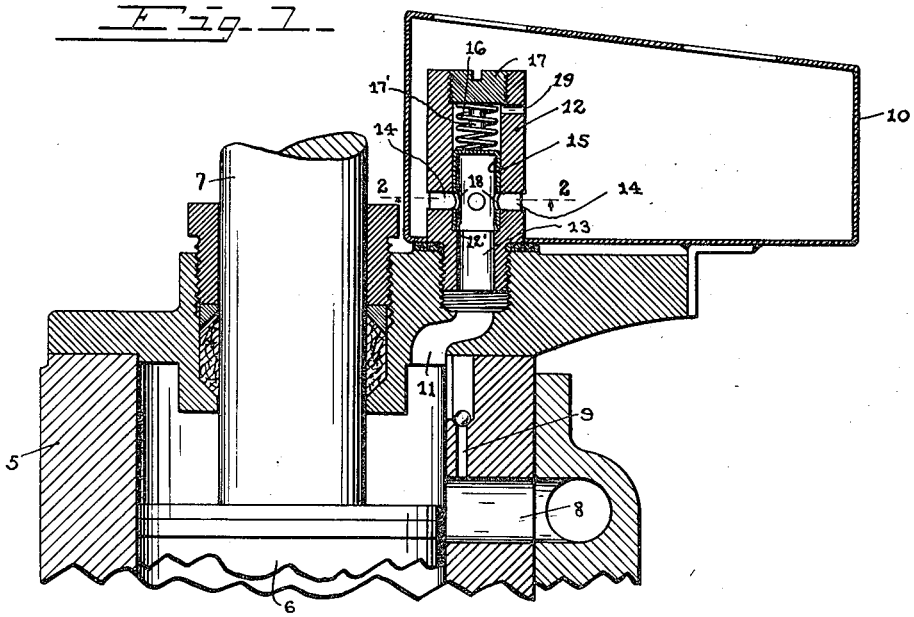
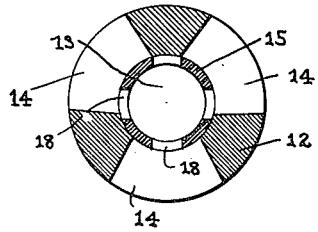
INVENTOR.
Julius P. Heil
BY Arthur Borchardt
Morsell, Keeney & Morsell.
ATTORNEYS.

Patented Dec. 7, 1926.

1,609,472

UNITED STATES PATENT OFFICE.

JULIUS P. HEIL AND ARTHUR BORCHARDT, OF MILWAUKEE, WISCONSIN.

OIL-TANK CHECK VALVE.

Application filed February 9, 1923. Serial No. 618,164.

This invention relates to improvements in oil tank check valves.

Fluid hoist dump body trucks are usually provided with cylinders having pistons actuated by oil under pressure for dumping the body. Overflow tanks are also provided for receiving the excess oil displaced when the piston rods are in the cylinders to their greatest extent. In dumping loads, the material will sometimes slide downwardly to the lower rear end of the body and the excess load at this end will tilt the upper end higher and pull pistons upwardly and force the oil from the cylinders at a speed greater than the capacity of the discharge ducts of the cylinders, with the result that the excess oil will under abnormal pressure rapidly flow into the storage tank and splash out of the upper openings thereof. As a result, considerable oil is wasted and in a short time there is not sufficient oil to operate the pistons, and it is necessary to replenish the supply.

It is one of the objects of the present invention to overcome the before mentioned objectionable features and provide a check valve which will momentarily stop the flow of oil to the tank when the pressure is abnormal.

A further object of the invention is to provide an oil tank check valve which will also serve to prevent excess weight on the outer end of a fluid hoist dump body from tilting the body at an abnormal speed.

A further object of the invention is to provide an oil tank check valve which is of very simple construction, is strong and durable and is well adapted for the purpose desired.

With the above and other objects in view, the invention consists of the improved oil tank check valve and its parts and combinations as set forth in the claims, and all equivalents thereof.

In the accompanying drawing, in which the same reference characters indicate the same parts in all of the views:

Fig. 1 is a vertical sectional view of the upper portion of a fluid hoist cylinder provided with an overflow tank having the improved check valve mounted therein; and Fig. 2 is a transverse sectional view of the check valve taken on line 2—2 of Fig. 1.

Referring to the drawing, the numeral 5 indicates a cylinder, 6 the piston and 7 the piston rod of a fluid hoist which is adapted to be mounted on a truck chassis to tilt or dump the body thereof. The upper end of the piston rod is connected to the front portion of a tiltable body (not shown) so that when the piston is in its upper position the body will be in tilted position. The cylinder is provided with ports 8 and 9 for controlling the flow of the oil and with an open tank 10 for receiving the overflow of oil from the cylinder and for storing an extra amount of oil for the cylinder. A duct 11 opens communication between the bore of the cylinder above the piston into the tank 10, and the improved check valve casing 12 is positioned in the tank and is threaded into the upper portion of said duct 11 so that the oil in passing from the cylinder to the tank and back again will flow through the bore 13 and the side ports 14 of said valve.

A tubular piston valve 15 closed at its upper end is slidably positioned in the bore 13 of the valve and is yieldingly held in its lower position by a coiled spring 16 which is interposed between the closed end of the piston valve 15 and a plug member 17 threaded in the upper end of the bore 13. Said plug is provided with a depending pin 17' for holding the spring in position. The piston valve is provided with side ports 18 which are in register with the ports 14 when said piston valve is in its lowermost position, as shown in Fig. 1. A shoulder 12' formed in the bore of the valve casing 12 limits the downward movement of the piston valve, and an opening 19 formed in the upper portion of the valve casing permits the escape of air or oil when the piston valve moves upwardly to closed position.

In normal operation the excess oil from the cylinder will flow through the valve casing and ports and into the tank without moving the piston valve, but if the shifting weight on the dump body should cause said body to tilt more rapidly than moved by the piston the said movement will cause the piston to rise with greater speed and move the oil in the cylinder above the piston at a greater speed than the capacity of the cylinder ports to permit the flow therethrough, with the result that the pressure on the oil will be increased above the tension of the valve spring and said valve will be moved upwardly to close the ducts 14 and stop the flow of oil therethrough and thereby check or retard the movement of the piston and the dump body tilted thereby, and serve the double function of preventing the too rapid movement of the dump body and the splashing of the oil out of the tank. As the pressure returns to normal the valve will automatically open.

From the foregoing description it will be seen that the oil tank check valve is of very simple construction, and is well adapted for the purpose described.

What we claim as our invention is:

1. An oil tank check valve, comprising a valve casing having a bore and a side port in communication therewith, a piston valve within the bore and normally in open position in register with the port to permit the free passage of a fluid through said port while the device to which the valve is connected is in operation under normal pressure, and means for yieldingly holding the piston valve in open position but responsive to abnormal pressure to permit the piston valve to move out of register with the bore port and close the said port and stop the operation of the device.

2. An oil tank check valve, comprising a valve casing having a bore and a side port in communication therewith, a piston valve within the bore and having a port which registers with the casing bore port when said valve is in open position to permit the free passage of a fluid through said ports while the device to which the valve is connected is in operation under normal pressure, and means for yieldingly holding the piston valve in open position but responsive to abnormal pressure to permit the piston valve to move its port out of register with the bore port and close the said ports and stop the operation of the device.

3. An oil tank check valve, comprising a valve casing having a bore and side ports in communication therewith, a piston valve slidably positioned within the bore and having a closed upper end and side ports which register with the casing side ports when said piston valve is in open position to permit the free passage of a fluid through said ports while the device to which the valve is connected is in operation under normal pressure, and means for yieldingly holding the piston valve in open position but responsive to abnormal pressure to permit the piston valve to move its ports out of register with the bore ports and close the said ports and stop the operation of the device.

4. An oil tank check valve, comprising a valve casing having a bore and side ports in communication therewith, a plug closing the upper end of the bore, a piston valve slidably positioned within the bore and having a closed upper end and side ports which register with the casing side ports when said piston valve is in its lower open position to permit the free passage of a fluid through said ports while the device to which the valve is connected is in operation under normal pressure, and a coiled spring positioned in the bore between the plug and the piston valve for yieldingly holding the piston valve in its lower open position but responsive to abnormal pressure to permit the piston valve to move its ports upwardly out of register with the bore ports and close the said ports and stop the operation of the device.

5. An oil tank check valve, comprising a valve casing having a bore and a lower threaded end and a plug in its upper end formed with a depending pin, said casing also having side ports in communication with the bore and an upper vent opening, a piston valve within the bore and having a closed upper end and side ports which register with the casing bore side ports when said piston valve is in open position to permit the free passage of a fluid through said ports while the device to which the valve is connected is in operation under normal pressure, and a coiled spring positioned in the bore between the plug and the piston valve and surrounding the plug pin for yieldingly holding the piston valve in its lower open position but responsive to abnormal pressure to permit the piston valve to move its ports upwardly out of register with the bore ports to close the said ports and stop the operation of the device.

6. The combination with a fluid hoist for dump bodies having a cylinder and a piston therein and an oil tank mounted above the cylinder, a check valve therefor comprising a valve casing positioned within the tank and threaded into the upper portion of the cylinder and having side ports opening communication between the tank and the cylinder, a closed top piston valve within the bore of the casing and having side ports which register with the casing side ports when said piston valve is in its lower open position to permit the free passage of oil from the cylinder through the ports to the tank and back again while the fluid hoist is in operation, and means for yieldingly holding the piston valve in its lower open position but responsive to abnormal pressure to permit the piston valve to move its ports upwardly out of register with the casing side ports to close said ports and stop the operation of the fluid hoist.

In testimony whereof, we affix our signatures.

JULIUS P. HEIL.
ARTHUR BORCHARDT.